US008565238B2

(12) United States Patent
Saegusa et al.

(10) Patent No.: US 8,565,238 B2
(45) Date of Patent: Oct. 22, 2013

(54) INDUSTRIAL NETWORK SYSTEM (75) Inventors: Takashi Saegusa, Hitachinaka (JP);
Terunobu Funatsu, Tsuchiura (JP);
Manabu Okamoto, Isesaki (JP); Ikuo Takemura, Oizumi (JP); Masaharu Yoshida, Oizumi (JP); Hideyuki Kamasuka, Ota (JP)

(73) Assignee: Hitachi High-Tech Instruments Co., Ltd., Saitama (JP)

( * ) Notice: Subject to any disclaimer, the term of this patent is extended or adjusted under 35 U.S.C. 154(b) by 233 days.

(21) Appl. No.: 13/022,052

(22) Filed: Feb. 7, 2011

(65) Prior Publication Data

US 2011/0200049 A1 Aug. 18, 2011

(30) Foreign Application Priority Data

Feb. 12, 2010 (JP) ................. 2010-028869

(51) Int. Cl.
*H04L 12/28* (2006.01)
*G06F 19/00* (2011.01)
(52) U.S. Cl.
USPC ........... 370/394; 370/254; 370/389; 370/519; 700/245
(58) Field of Classification Search
None
See application file for complete search history.

(56) References Cited

U.S. PATENT DOCUMENTS

| 5,262,954 | A  | * | 11/1993 | Fujino et al. ................. 700/112 |
| 6,640,308 | B1 | * | 10/2003 | Keyghobad et al. .......... 713/300 |
| 7,215,250 | B2 | * | 5/2007  | Hansen et al. ............. 340/572.9 |
| 7,904,184 | B2 | * | 3/2011  | Chaffee ........................ 700/29 |
| 7,969,985 | B1 |   | 6/2011  | Cline et al. |
| 8,179,923 | B2 | * | 5/2012  | Krause ........................ 370/493 |
| 2002/0110155 | A1 |  | 8/2002  | Pearce et al. |
| 2009/0076984 | A1 | * | 3/2009 | Guionnet ...................... 705/400 |
| 2009/0135295 | A1 | * | 5/2009 | Kunishige et al. ............ 348/362 |
| 2010/0324730 | A1 |   | 12/2010 | Müller |

FOREIGN PATENT DOCUMENTS

| DE | 10 2007 052 673 A1 | 5/2009 |
| JP | 2001-197078 | 7/2001 |
| WO | WO 2008/127630 A1 | 10/2008 |

OTHER PUBLICATIONS

Zhang et al., "Priority Scheduling in Switched Industrial Ethernet," *P Amer Contr Conf*, 2005, 5:3366-3370.
Extended European Search Report issued in European Patent Application No. 11000824.0, dated Jul. 26, 2011.

* cited by examiner

*Primary Examiner* — Mark Rinehart
*Assistant Examiner* — Hicham Foud
(74) *Attorney, Agent, or Firm* — McDermott Will & Emery LLP (57) ABSTRACT

A central communication unit 110 and a terminal communication unit 120 are provided with a priority order number storing unit 115 and fifo type storing units, and perform communication according to the priority order of data communication stored in the priority order number storing unit 115. At this time the priority order and the layout of respective devices of control objects are optimized and set through a software processing in a host computer according to the communication cycle and response performance required for the devices of control objects, thereby, the plurality of devices of control objects requiring different communication cycles and response performances can be connected on one network.

11 Claims, 5 Drawing Sheets

INDUSTRIAL NETWORK SYSTEM

CLAIM OF PRIORITY

The present application claims priority from Japanese application serial No. 2010-028869, filed on Feb. 12, 2010, the contents of which is hereby incorporated by references into this application.

FIELD OF THE INVENTION

The present invention relates to an industrial network system that controls a plurality of control objects, and, in particular, relates to an improvement in an industrial network system that multiplexes a plurality of input and output data signals in to a single transmission path and achieves wiring saving.

DESCRIPTION OF PRIOR ART

An industrial network system is constituted by a host computer, a central communication unit connected to the host computer and a plurality of terminal communication units provided with variety types of I/O ports, and is used by constituting a network through connection the central communication unit and the plurality of terminal communication units in a form of such as a multi drop and a dizzy chain.

Conventionally, data input and output between a plurality of devices representing control objects laid out distributedly and a host computer was performed by directly connecting the respective devices to the host computer, thereby, many wirings were required.

In an industrial network system, when a plurality of devices of control objects laid out distributedly are connected to a host computer through a network, and the input and output signals for the devices of control objects are multiplexed, the data input and output between the host computer and the plurality of devices of control objects are realized through simple connections with limited wirings, accordingly, such industrial network system is primarily utilized in a field of automobiles, machine tools and industrial machines like chip mounters where such as many numbers and types of devices of control objects are required and the layout of the devices is easily distributed.

Further, in an industrial network system, such as required communication cycle and response performance are greatly different depending on devices of control objects such as digital I/O devices and servo actuators.

In a conventional industrial network system, in order to guarantee same communication cycle and response performance for all of the devices depending on the number of devices of control objects connected to one network, it is necessary to constitutes a network that guarantees that all of the devices operate at their highest required performance, even when required performances of the respective devices of control objects are different, resultantly, an excessively high communication speed is required for the entire network. Such excessively high communication speed causes to reduce noise resistance performance of the network, and results in further shortening of data transmission distance.

In order to resolve such problems, a control method is used in which devices requiring high communication cycle and response performance are directly connected to a host computer through a separate control line not via a network. However, this method requires such as extending a plurality of wirings from the host computer and necessitating the host computer performing a different control processing from the side of the network, thereby, the entire system complexes.

Further, a technology is known in which by setting priority and sampling interval for communication data, information is efficiently collected for control devices having a fast communication cycle and a large communication traffic (JP-A-2001-19707). However, with this method, since a central communication unit regulates timing by polling, it is not easy that the central communication unit and terminal communication units communicate at free timing. Further, it is difficult to set such as priority and sampling interval while including a layout of the network.

SUMMARY OF THE INVENTION

The present invention has been made in view of the above referred to tasks of the conventional system, and a primary object of the present invention is to realize a system that permits to connect on one network a plurality of devices of control objects requiring such as different communication cycle and response performance without necessitating an excessively high communication speed by properly setting priority orders of data communication with the respective control objects and a layout of the devices of control objects on the network.

Another object of the present invention is to realize a system that permits to easily constitute a network guaranteeing a required performance by optimizing the priority orders of data communication with the respective control objects and a layout of the devices of control objects on the network as explained above according to such as required communication cycle and response performance for the respective devices of control objects and by determining the priority orders as well as by presenting to a user a network connection configuration in advance.

A primary feature of the present invention resides in an industrial network system that is provided with an central communication unit including a host computer interface unit, a first I/O data storing unit, a second I/O data storing unit, an identification number storing unit, a communication cycle data storing unit, at least one communication port, at least two first in first out (fifo) type storing units per one communication port and a central communication control unit, and a plurality of terminal communication units each including one upstream communication port, at least two downstream communication ports, at least two fifo type storing units per one downstream communication port, at least one I/O port, a terminal communication control unit, an identification number storing unit, a priority order number storing unit and a communication cycle information storing unit, wherein by connecting the upstream communication ports of the terminal communication units to the communication port in the central communication unit or to a downstream communication port of any other terminal communication unit in the plurality of terminal communication units, priority orders of data communication with the respective control objects and a layout of the devices of control objects on the network are designed to be set properly.

In addition to the above features, highly practical systems are proposed by constituting the present invention in the following embodying manner.

An embodiment is characterized, in that the central communication unit sends numbers representing priority orders of data communication from the host computer stored in the priority order number storing unit to the terminal communication units, the concerned terminal communication unit stores the received priority order number in the priority order number storing unit, when sending output data to the terminal communication unit, the central communication unit stores the output data in the fifo type storing unit corresponding to the priority order number of the concerned terminal communication unit, the communication port takes out orderly the output data from fifo type storing units according to the height of priority order and sends the same, the terminal communication unit forms its own input data packet by combining the input value from the I/O port and the priority order number information stored in the priority order number storing unit and outputs the same to the upstream, the data from the downstream are stored in separate fifo type storing units corresponding to the priority order number of the input data packet, and the input data packets stored in the fifo type storing units are orderly sent out according to their height of the priority order to the upstream communication port.

Further, the central communication unit sends to terminal communication units individual values based on communication cycles required for every control object that is stored in the communication cycle information storing unit from the host computer, the terminal communication unit stores the received individual value based on the communication cycle in the communication cycle information storing unit and transfers the output data at a cycle based on the value to the respective terminal communication unit, the central communication unit causes to store the input value of the I/O port received from the terminal communication unit in the first input data storing unit, and causes to store the value in the first input data storing unit in the second input data storing unit based on the communication cycle in the communication cycle information storing unit, and the host computer is constituted so as to confirm the values of the I/O ports of the respective terminal communication units with reference to the second input data storing unit in the central communication unit.

In order to achieve the other object of the present invention, the constitution as well as the setting as follows are also the features of the present invention, thereby, a system is realized that permits to easily constitute a network guaranteeing a required performance of which will be explained concretely and in detail with reference to an embodying manner to be carried out as explained herein below.

At first, the summed value of the values of communication cycles stored in the communication cycle information storing units in all of the terminal communication units connected to the network is set below the maximum performance of the network.

Secondly, in order to maintain the communication cycles required for the respective control objects, the values of the priority order number is set so that the time variability of the communication cycles of the terminal communication units is confined within a range of one cycle.

Set values of the priority order numbers of the terminal communication units and number of terminal communication units to be passed from the central communication unit to an objective terminal communication unit are set based on a communication delay time from a control object to the host computer required for the respective control devices.

Further, the host computer determines communication delay times from terminal communication units for the respective control objects by making use of priority of terminal communication units, number of communication packets of terminal communication units of which priority is equal to or higher than the priority order set for the concerned terminal communication unit communication time per one communication path and the number of terminal communication units to be passed from the central communication unit to an objective terminal communication unit, changes the priority of the respective terminal communication units so as to fulfill a communication delay time required for the control object and sets the priority of the terminal communication unit.

Further, the host computer determines communication delay times from terminal communication units for the respective control objects by making use of priority of terminal communication units, number of communication packets of terminal communication units of which priority is equal to or higher than the priority order set for the concerned terminal communication unit, communication time per one communication path and the number of terminal communication units to be passed from the central communication unit to an objective terminal communication unit, changes the layout of the control object so as to fulfill a communication delay time required for the control object and sets the number of terminal communication units to be passed from the central communication unit to an objective terminal communication unit.

Software in the host computer is provided with a function capable of setting the communication cycle required for the control object from the information input unit.

Further, the software in the host computer is provided with a function capable of setting the communication cycles required for all of the control objects, a maximum allowable communication delay time and a connection configuration (depth) of the terminal communication units on the network from the information input unit.

The setting function and the display function of the network constitution included in the software of the host computer are mounted through a GUI (graphical user interface).

Further, as a concrete application example to industrial machines, when selecting a plurality of control devices constituting a chip mounter as the devices of control objects for the industrial network system as explained above, and connecting the plurality of control devices constituting the chip mounter to the plurality of terminal communication units of the present system, the effect that will be explained below can be realized in the chip mounter.

EFFECTS OF THE INVENTION

According to the primary aspect of the present invention, an industrial network system can be constituted in which a plurality of devices of control objects having different communication cycle and response performance are connected on one network, and which is controllable with a proper communication speed.

According to the other aspect of the present invention, since a proper setting of priority order of data communication with the control objects and of layout of the devices of control objects on the network, which is necessary for connecting a plurality of devices of control objects having different communication cycle and response performance on one network and for controlling with a proper communication speed, can be optimized and determined through software processing of the host computer, an effect can be accomplished that a network guaranteeing required performance of the respective devices of control objects can be easily constructed.

DETAILED DESCRIPTION OF PREFERRED EMBODIMENTS

Herein below, an embodying manner of the present invention will be explained with reference to one embodiment as shown in the drawings.

Figure 1:
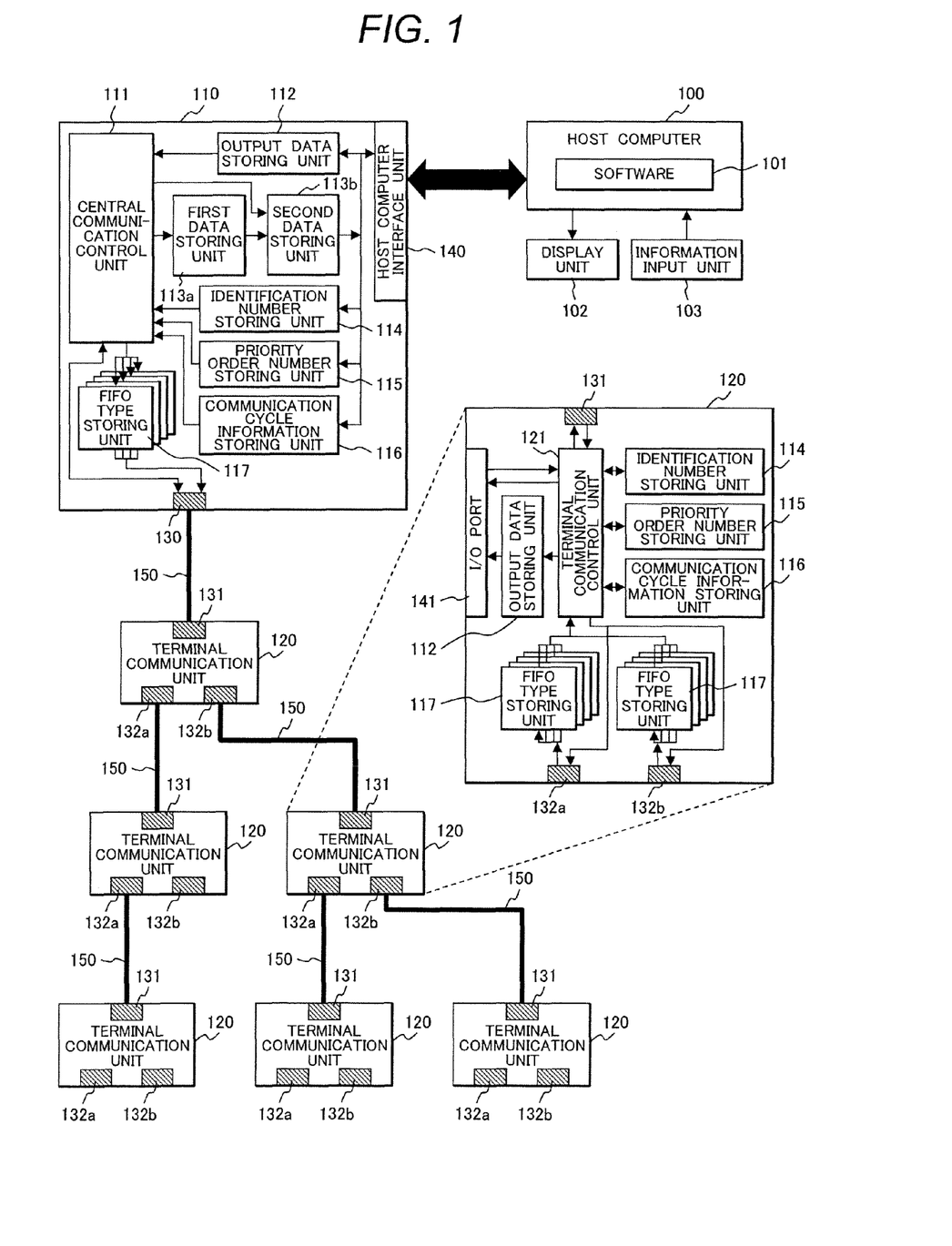
FIG. 1 is a diagram showing a constitution of a network I/O system of an embodiment according to the present invention.

FIG. 1 is a constitutional diagram of an industrial network system relating to one embodiment according to the present invention. Further, in the drawing, an enlarged illustration of a terminal communication unit 120 correlated by dotted lines shows the details thereof.

The industrial network system in the present embodiment is constituted by a host computer 100, a central communication unit 110 and a plurality of terminal communication units 120.

The host computer 100 is provided with a software 101, a display unit 102 and an information input unit 103.

The central communication unit 110 is provided with a host computer interface unit 104, an output data storing unit 112, a first input data storing unit 113a, a second input data storing unit 113b, an identification number storing unit 114, a priority order number storing unit 115, a communication cycle information storing unit 116, a communication port 130 and a central communication control unit 111.

The terminal communication unit 120 is provided with an upstream communication port 131, downstream communication ports 132a, 132b, an I/O port 141, an identification number storing unit 114, a priority order number storing unit 115, a communication cycle information storing unit 116 and a terminal communication control unit 121.

Further, the central communication unit 110 and the terminal communication units 120 are respectively provided with a same number of fifo type storing units as the number of priority order numbers for the one communication port 130 and for the downstream communication ports 132a, 132b.

The upstream communication ports 131 in the respective terminal communication units 120 are respectively connected either to the communication port 130 in the central communication unit 110 or to the downstream communication port 132a or the downstream communication ports 132b in any other terminal communication unit 120 among the terminal communication units 120.

Further, at the ends of I/O ports 141 in the terminal communication units 120, different control objects, for example, such as an I/O controlled device and a servo driver are connected for every one of the pluralities of terminal communication units 120.

Now, an operation of the host computer 100 in the present embodiment will be explained.

The host computer 100 causes to store information of identification number set at the respective terminal communication units 120 in the identification number storing unit 114 via the host computer interface unit 140. Further, the host computer 100 causes to store priority order number information for the respective terminal communication units 120 determined according to a preparation method, which will be explained later, via the host computer interface unit 140 in the priority order number storing unit 115.

Further, the host computer 100 causes to store communication cycle information for setting updating cycle of input and output value of the I/O port 141 in the respective terminal communication units 120 and whether the updating of the input and output value is performed periodically or instantly in the communication cycle information storing unit 116 via the host computer interface unit 140.

Further, the host computer 100 causes to store output values of the I/O port 141 in the respective terminal communication units 120 in the output data storing unit 112 of the central communication unit 110 via the host computer interface unit 140, and confirms input values from the I/O ports 141 in the respective terminal communication units 120 with reference to the values stored in the second input data storing unit 113b of the central communication unit 110.

Now, an operation of the central communication unit 110 according to the present embodiment will be explained.

The central communication unit 110 performs data transmission and reception with the host computer 100 via the host computer interface unit 140, and data transmission and reception with the respective terminal communication units 120 via the communication port 130 controlled by the central communication control unit 111.

When the host computer 100 sets identification numbers of the respective terminal communication units 120 in the identification number storing unit 114 and priority order numbers of the respective terminal communication unit 120 in the priority order number storing unit 115, the central communication control unit 111 outputs priority order number setting packets formed by combining the identification number and the priority order number for every one of the terminal communication units 120 to the communication port 130.

Further, when the host computer 100 sets identification numbers of the respective terminal communication units 120 in the identification number storing unit 114 and communication cycle information of the respective terminal communication units 120 in the communication cycle information storing unit 116, the central communication control unit 111 transmits communication cycle information setting packets formed by combining the identification number and the communication cycle information for every one of the terminal communication units 120 to the respective terminal communication units 120 via the communication port 130.

Further, when an output value for an I/O port 141 in a terminal communication unit 120 is set in the output data storing unit 112, the central communication control unit 111 instantly transmits an output data packet formed by combining the identification number and the output value of the terminal communication unit 120 to the terminal communication unit 120 via the communication port 130, and during the period of no output value change transmits periodically the output data packet to the terminal communication unit 120 based on the communication cycle set in the communication cycle information storing unit 116.

When a plurality of output data packets are prepared, the output data packets are stored in the respective fifo type storing units 117 corresponding to the priority order numbers of the terminal communication units 120 stored in the priority order number storing unit 115, and the communication port 130 takes out the respective output data packets orderly from the fifo type storing units 117 according to the height of priority order thereof and transmits the same to the corresponding terminal communication unit 120.

Further, when an input data packet formed by combining the identification number of a terminal communication unit 120 and an input value of the I/O port 141 is inputted via the communication port 130, and when the communication cycle information in the communication cycle information storing unit 116 corresponding to the identification number in the input data packet is set at an instant updating mode, the central communication control unit 111 causes to store the input value of the packet instantly in the second input data storing unit 113b, and when the communication cycle information is set at a periodic updating mode, the central communication control unit 111 causes to store the input value of the packet in the first input data storing unit 113a, and the first input data storing unit 113a periodically transfers the input value to the second input data storing unit 113b based on the communication cycle stored in the communication cycle information storing unit 116.

The communication port 130 transmits respective packets inputted to the central communication control unit 111 or the fifo type storing units 117 to the upstream communication port 131 of the connected terminal communication unit 120, and outputs a packet received from the upstream communication port 131 of the connected terminal communication unit 120 to the central communication control unit 111.

Now, an operation of the terminal communication unit 120 according to the present embodiment will be explained.

Each terminal communication unit 120 performs, by means of the terminal communication control unit 121, data transmission and reception with a connected device via the I/O port 141, data transmission and reception with the central communication unit 110 or another terminal communication unit 120 via the upstream communication port 131 and data transmission and reception with another terminal communication unit 120 via the downstream communication port 132a or the downstream communication port 132b.

When a packet inputted from the upstream communication port 131 is a priority order number setting packet, and the identification number information in the priority order number setting packet coincides with the identification number stored in its own identification number storing unit 114, the terminal communication control unit 121 causes to store the priority order number in its own priority order number storing unit 115, and when not coincides, the terminal communication control unit 121 transmits the packet to the downstream communication port 132a and the downstream communication port 132b.

Further, when a packet inputted from the upstream communication port 131 is a communication cycle information setting packet, and the identification number information in the communication cycle information setting packet coincides with the identification number stored in its own identification number storing unit 114, the terminal communication control unit 121 causes to store the communication cycle information in its own communication cycle information storing unit 116, and when not coincides, the terminal communication control unit 121 transmits the packet to the downstream communication port 132a and the downstream communication port 132b.

Further, when a packet inputted from the upstream communication port 131 is an output data packet, and the identification number information in the output data packet coincides with its own identification number, the terminal communication control unit 121 refers to the communication cycle information stored in the communication cycle information storing unit 116, and when the communication cycle information is set at an instant updating mode, the terminal communication control unit 121 outputs instantly the output value of the input data packet to the I/O port 141. When the communication cycle information is set at a periodic updating mode, the output value of the output data packet is stored in the output data storing unit 112, and the output data storing unit 112 outputs the output value to the I/O port 141 based on the communication cycle information stored in the communication cycle information storing unit 116.

Further, when a packet inputted from the upstream communication port 131 is an output data packet, and the identification number information in the output data packet does not coincide with its own identification number, the terminal communication control unit 121 transmits the output data packet to the downstream communication port 132a and the downstream communication port 132b.

Further, when the input value from the I/O port 141 changes, the terminal communication control unit 121 instantly transmits an input data packet formed by combining the input value, its own identification number and its own priority order number in the priority order number storing unit 115 to the upstream port 131, and during the period of no input value change, the input value is periodically transmitted to the upstream port 131 based on the communication cycle set in the communication cycle information storing unit 116.

Further, when an input data packet is inputted from the downstream communication port 132a or the downstream communication port 132b, the terminal communication control unit 121 causes to store the input data packet in a fifo type storing unit 117 corresponding to the priority order number included in the input data packet, and takes out the respective input data packets orderly from the fifo type storing units 117 according to the height of priority order thereof and transmits the same from the upstream communication port 131 to the central communication unit 110 or another terminal communication unit 120.

Figure 2:
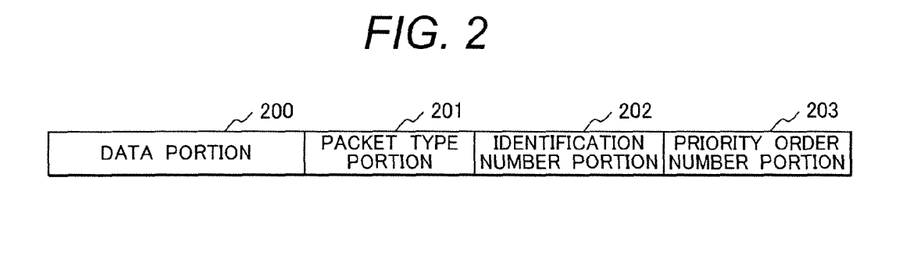
FIG. 2 is a view for explaining an example of a packet format used for communication in a network according to the present invention.

FIG. 2 shows a format of a packet used in data communication. The format of packet is constituted by a data portion 200, a packet type portion 201 indicating types of the packet, an identification number portion 202 indicating an identification number of the terminal communication unit 120 and a priority order number portion 203 indicating a priority order number set for the terminal communication unit 120.

The data portion 200 is provided with input and output data for the I/O port 141 in the terminal communication unit 120 or such as the priority order number and the communication cycle information set for the terminal communication unit 120.

The packet type portion 201 is provided with, for example, such values, when the packet type is an input data packet, "10", when an output data packet, "11", when a priority order number setting packet, "50", and when a communication cycle setting packet, "60". After referring to the packet type portion 201, the central communication unit 110 and the terminal communication unit 120 judge the type of the packet and perform processing for the respective data.

When transmitting a packet from the central communication unit 110 to a terminal communication unit 120, an identification number set for the terminal communication unit 120 representing transmission destination, namely, the identification number of the terminal communication unit of transmission destination is set in the identification number portion 202, and when transmitting a packet from a terminal communication unit 120 to the central communication unit 110, its own identification number set for the terminal communication unit 120, namely, the identification number of the terminal communication unit 120 of transmission origin is set in the identification number portion 202.

Further, when transmitting a packet from the central communication unit 110 to a terminal communication unit 120, a priority order number stored in the priority order number storing unit 115 in the central communication unit 110 is provided in the priority order number portion 203. Further, when transmitting a packet from a terminal communication unit 120 to the central communication unit 110, its own priority order number stored in the priority order number storing unit 115 in the terminal communication unit 120 is set in the priority order number portion 203.

Figure 3:
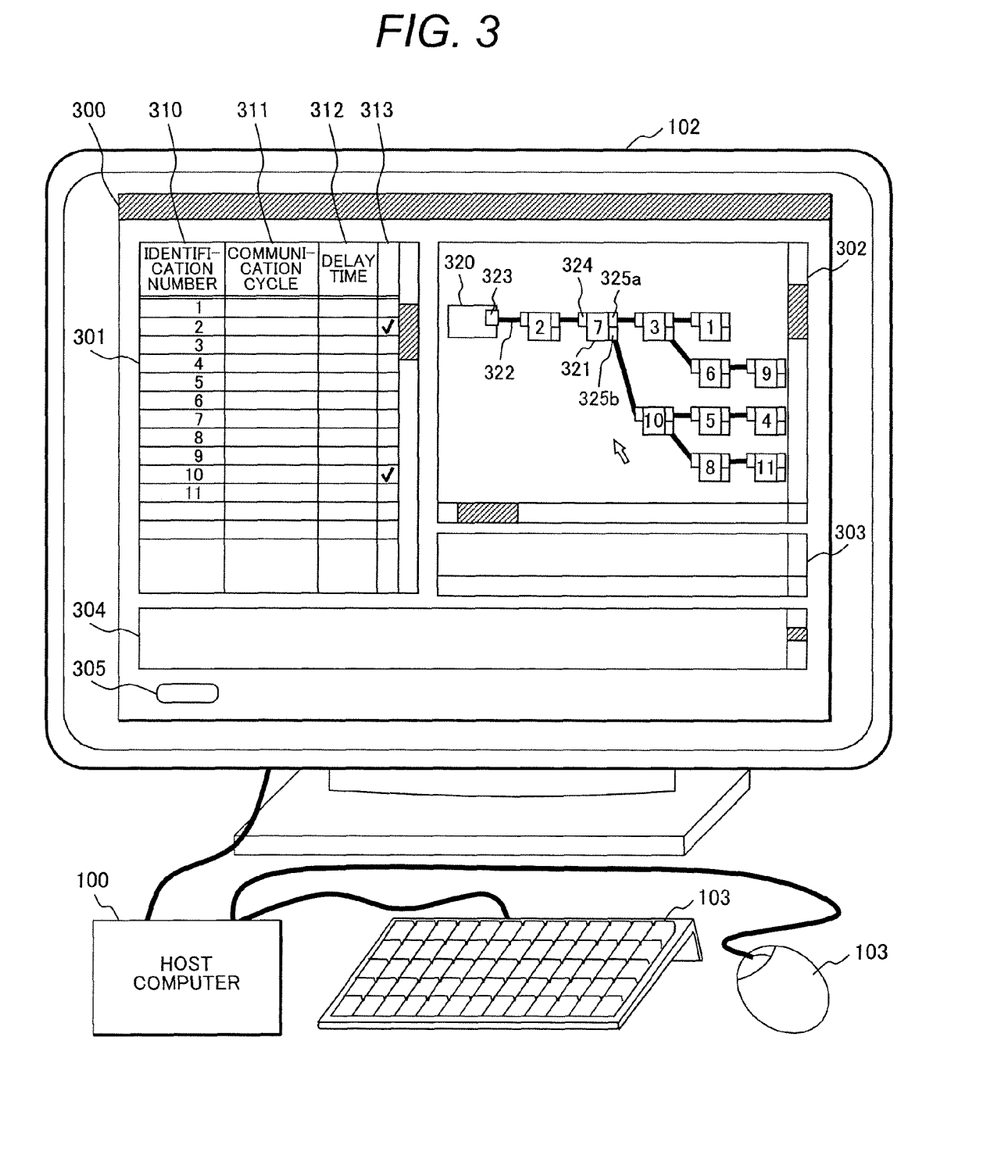
FIG. 3 is a view for explaining a display example on a screen and a function of an application in an embodiment according to the present invention.

FIG. 3 is an example of display on a screen by an application 300 based on a GUI (graphic user interface) that is utilized through the host computer 100, when a system user optimizes the priority order number and the network connection configuration and sets the same by making use of the display unit 102 and the information input unit 103.

The application 300 is constituted by a communication performance setting portion 301, a network connection configuration setting portion 302, a network connection configuration displaying portion 303, a process displaying portion 304 and an optimization processing start button 305.

The communication performance setting portion 301 is constituted by an identification number setting portion 310, a communication cycle setting portion 311, a communication delay time setting portion 312 and an input and output data updating mode setting portion 313, and the identification number setting portion 310 is provided with a function of setting an identification number to a terminal communication unit 120, the communication cycle setting portion 311 a function of setting an updating cycle of input and output value required for a device of control object connected to the terminal communication unit 120, the communication delay time setting portion 312 a function of setting an allowable maximum communication delay time for the device of control object connected to the terminal communication unit 120 and the input and output data updating mode setting portion 313 a function of setting whether the required input and output value updating mode is periodic or instant for the device of control object connected to the terminal communication unit 120 respectively through operation of a system user.

The network connection configuration setting portion 302 and the network connection configuration displaying portion 303 are constituted by a central communication unit symbol 320, a terminal communication unit symbol 321 including an upstream communication port symbol 324 and downstream port symbols 325a, 325b and a connecting state symbol 322.

Further, through operation of a system user, the network connection configuration setting portion 302 connects the upstream communication port symbol 324 of the terminal communication unit symbol 321 and a communication port symbol 323 of the central communication unit symbol 320, or connects the upstream communication port symbol 324 and any one of the downstream communication port symbol 325a or 325b of another terminal communication unit symbol 321 with the connection state symbol 322, thereby, a network structure is prepared on the software.

The network configuration displaying portion 303 displays a result after the network connection configuration set in the network connection configuration setting portion 302 is optimized and modified through a processing as will be explained later. Further, the terminal communication unit symbol 321 displays the designated identification number therein.

After all of setting of the communication performance setting portion 301 and the network connection configuration setting portion 302 has been competed, when the optimization processing start button 305 is pressed, the application 300 optimizes the priority order number and layout on the network of the respective terminal communication units 120, causes to store the determined priority order number in the priority order number storing unit 115 in the central communication unit 110 via the host computer interface unit 140 and displays the determined layout of the terminal communication units 120 in the network on the network connection configuration displaying portion 303.

Further, a communication cycle set by the communication cycle setting portion 311 in the communication performance setting portion 301 is stored in the communication cycle storing unit 116 in the central communication unit 110 at the same time.

Figure 4:
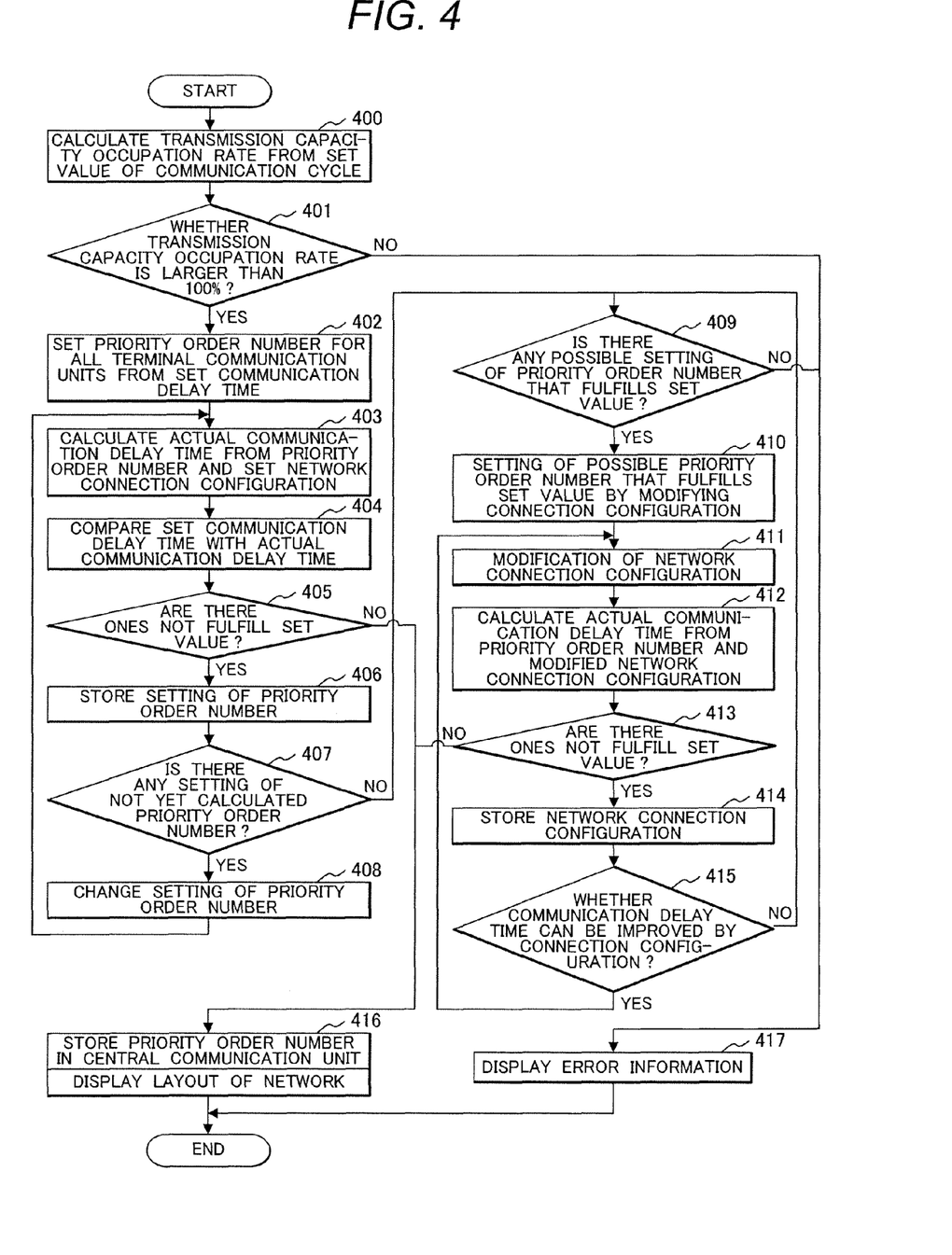
FIG. 4 is a flowchart for explaining a concrete processing sequence for optimization of priority order number and of network connection configuration according to the present invention.

FIG. 4 shows in a form of flowchart a processing for optimizing the priority order number set for the terminal communication units 120 and the connection configuration on the network executed by the application 300 after the optimization processing start button 305 is pressed.

At first, the application 300 calculates a transmission capacity occupation rate of the network at the time of actual system operation based on the communication cycle set in the communication performance setting portion 301 (process 400).

Herein, when assuming that the communication speed of the network as V [bits/second], the data length (number of bits) when a communication packet is actually transferred as PLEN [bits], a number of packets required for one time data communication of the respective terminal communication units 120 as $PNUM_x$ (x=1, 2, . . . , n) [pieces], the total numbers of the respective terminal communication units 120 as n and the communication cycle set for the respective terminal communication units 120 as $CYCLE_x$ (x=1, 2, . . . , n) [second], the transmission capacity occupation rate U [%] is determined by calculating the following mathematical formula 1.

$$U = 1/V \times \Sigma PLEN \times PNUM_k / CYCLE_k$$
$$(k=1, 2, \ldots, n)$$    [Mathematical Formula 1]

Subsequently, when the transmission capacity occupation rate determined by the calculation in process 400 is larger than 100%, namely, when the system according to the set communication cycle exceeds the maximum performance of the network (process 401), the application 300 displays the calculation result on the process display portion 304 as error information (process 417).

When the transmission capacity occupation rate determined by the calculation in process 400 is smaller than 100%, namely, when the system according to the set communication cycle does not exceed the maximum performance of the network (process 401), a plurality of terminal communication units having close values of communication delay time set at the communication performance setting portion 301 are grouped as one group, all of the terminal communication units are divided into same numbers of groups as the numbers of the priority order number, the minimum values among the communication delay times in the respective groups are determined as the representative communication delay times for the respective groups and the priority order number is set for all of the terminal communication units so that the priority order becomes successively higher for groups having smaller representative communication delay time (process 402).

Subsequently, actual communication delay time that is communication delay time guaranteed by the actual system is calculated for all of the terminal communication units 120 according to the priority order number set and the network connection configuration set at the network connection configuration setting portion 302 (process 403).

Herein, when assumed that a total number of terminal communication units 120 contained in a group of a certain priority order number i (i=1, 2, ..., m) as $N_i$, priority order number set for the respective terminal units as PRI (x) (x=1, 2, ..., n), communication time required per one line of a communication cable 150 in the network as nDELAY [second], groups of terminal communication units 120 having priority order equal to or more than that of the concerned terminal communication unit 120 as HPG, a number of packets required for one time data communication of the terminal communication units 120 contained in HPG as $PNUM_y$, {y|y ∈ HPG}, the communication cycle of the terminal communication units 120 contained in HPG as $CYCLE_y$ [second], a coefficient of which initial value is 1 that is provided for every one of terminal communication units contained in HPG as $A_y$, a maximum value of transmission waiting time $WAIT_x$ [second] of packets of the concerned terminal communication unit 120 that is required until transmission of packets to the terminal communication units 120 having priority order equal to or higher than that of the concerned terminal communication unit 120 has been completed, is at first determined.

At first, the mathematical formula as shown in mathematical formula 2 is calculated.

Subsequently, based on the calculation result according to the mathematical formula 2, it is judged whether the mathematical formula as shown in mathematical formula 3 is fulfilled for all of y, every time when fulfilled, mathematical formula 4 is calculated, and after calculation, the value $WAIT_x'$ is replaced with $WAIT_x$ and the value $A_y'$ replaced with $A_y$ respectively.

After performing this calculation for all of y, again, the calculation according to mathematical formulas 3 and 4 is repeated. By repeating the above calculation until mathematical formula 3 does not fulfill for all of y, a correct value of $WAIT_x$ is determined.

Herein, when assumed the number of terminal communication units 120 to be passed from the central communication unit 110 to the concerned terminal communication unit 120 as depth, and when the depth of the respective terminal communication units 120 is represented as $DEPTH_x$ (x=1, 2, ..., n), the actual communication delay time $rDELAY_x$ [second] of the respective terminal communication units 120 of which setting in the input and output data updating mode setting portion 313 is instant updating is determined by calculating the mathematical formula as shown in mathematical formula 5 while making use of $WAIT_x$ determined by the above calculation method.

$$WAIT_x = nDELAY \times \Sigma PNUM_y \qquad \text{[Mathematical Formula 2]}$$

$$WAIT_x/(A_y \times CYCLE_y) > 1 \qquad \text{[Mathematical Formula 3]}$$

$$WAIT_x' = WAIT_x + (nDELAY \times PNUM_x)$$
$$A_y' = A_y + 1 \qquad \text{[Mathematical Formula 4]}$$

$$rDELAY_x = (nDELAY+1) \times DEPTH_x + WAIT_x \qquad \text{[Mathematical Formula 5]}$$

Further, an actual communication delay time $cDELAY_x$ [second] of a terminal communication unit 120 of which updating is set in the input and output data updating mode setting portion 313 as periodic is determined by calculating the mathematical formula as shown in mathematical formula 6.

$$cDELAY_x = rDELAY_x \times 2 \qquad \text{[Mathematical Formula 6]}$$

Subsequently, a comparison between the set communication delay time and the actual communication delay time determined by the calculation is executed for all of the terminal communication units 120 (process 404)

As the result of process 404, when the actual communication delay times of all of the terminal communication units 120 are smaller than the set communication delay times, namely, the set values of communication delay time for all of the terminal communication units 120 are fulfilled (process 405), the application 300 causes to store the priority order numbers at this time as effective values in the priority order number storing unit 115 in the central communication unit 110, and to display the network connection configuration at this time as effective on the network connection configuration setting displaying portion 303 (process 416).

As the result of process 404, when an actual communication delay time is larger than the set communication delay time, namely, the set value of communication delay time for at least one terminal communication units 120 is not fulfilled (process 405), the setting of priority order numbers for all of the terminal communication units at this time is stored as a setting of incorrect priority order numbers in a memory of the host computer 100 (process 406).

Subsequently, when modifying the setting of the priority order number by moving some of the terminal communication units 120 contained in a group in another group, when there is at least one pattern that is not stored in the memory as incorrect priority order number setting among a plurality of priority order number setting patterns, namely, when there is a priority order number setting pattern of which actual communication delay time is not yet calculated (process 407), the group of terminal communication units 120 is modifies so as to form one of priority order number setting patterns other than the incorrect priority order setting (process 408), and the process returns to process 403 to perform the calculation again.

Further, when modifying the setting of the priority order number by moving some of the terminal communication units 120 contained in a group in another group, and when all of the plurality of priority order number setting patterns are incorrect priority order number settings stored in the memory, namely, when the actual communication delay time calculated for all of the priority order number setting patterns do not fulfill the set values of the communication delay time (process 407), if there is a possibility of fulfilling the set values of the communication delay time by modifying the network connection configuration (depth) of the terminal communication units 120 (process 409), the priority order number at that time is set for all of the terminal communication units 120 (process 410).

Subsequently, the connection configuration of any terminal communication units 120 that do not fulfill the set values of the communication delay time as above is modified so that the depth thereof on the network becomes small (process 411).

Subsequently, the actual communication delay time for all of the terminal communication units 120 is calculated according to the set priority order number and the network connection configuration modified through process 411 in a like processing as process 403 (process 412).

As the result of process 412, when the actual communication delay times of all of the terminal communication units 120 are smaller than the set communication delay times, namely, when the set values of communication delay time for all of the terminal communication units 120 are fulfilled (process 413), the application 300 causes to store the priority order numbers at this time as effective values in the priority order number storing unit 115 in the central communication unit 110, and to display the network connection configuration at this time as effective on the network connection configuration setting displaying portion 303 (process 416).

As the result of process 412, when an actual communication delay time is larger than the set communication delay time, namely, when the set value of communication delay time for at least one terminal communication units 120 is not fulfilled (process 413), the network connection configuration for all of the terminal communication units 120 at this time is stored as an incorrect connection configuration in a memory of the host computer 100 (process 414).

Subsequently, when the layout of any terminal communication units 120 that do not fulfill the set values of the communication delay time is modified so that the depth thereof on the network becomes small, all of network connection configuration patters are taken out, and when there is at least one pattern that is not stored in the memory as incorrect connection configuration, namely, there is any room for improving the actual communication time by modifying the connection configuration (process 415), the connection configuration of the respective terminal communication units 120 is modifies so as to form one of the network connection configuration patterns other than the incorrect connection configuration (process 411), and the calculation is performed again.

Further, when the layout of any terminal communication units 120 that do not fulfill the set values of the communication delay time is modified so that the depth thereof on the network becomes small, all of network connection configuration patters are taken out, and when all of the patterns are the incorrect connection configuration stored in the memory, namely, when there is no room for improving the actual communication time by modifying the connection configuration (process 415), if there is a possible priority order number setting method of fulfilling the set values of the communication delay time by modifying the network connection configuration (depth) of the terminal communication units 120 (process 409), the priority order number is set for all of the terminal communication units 120 (process 410), and the calculation is performed again.

Herein, if there is no possible priority order number setting method of fulfilling the set values of the communication delay time by modifying the network connection configuration (depth) of the terminal communication units 120 (process 409), the application 300 causes to display a combination of a communication delay time and a network connection configuration when the number of terminal communication units 120 that do not fulfill the set value of the communication delay time is least among combinations of the incorrect priority order number settings and the incorrect connection configurations stored in the memory as an error information.

Through the above processings, the software 101 in the host computer 100 optimizes and determines the priority order number set for the terminal communication units 120 and the connection configuration (depth) on the network of the terminal communication units 120 that can guarantee operations of a plurality of devices of control objects on one network with varieties of communication cycles and communication delay times.

Figure 5:
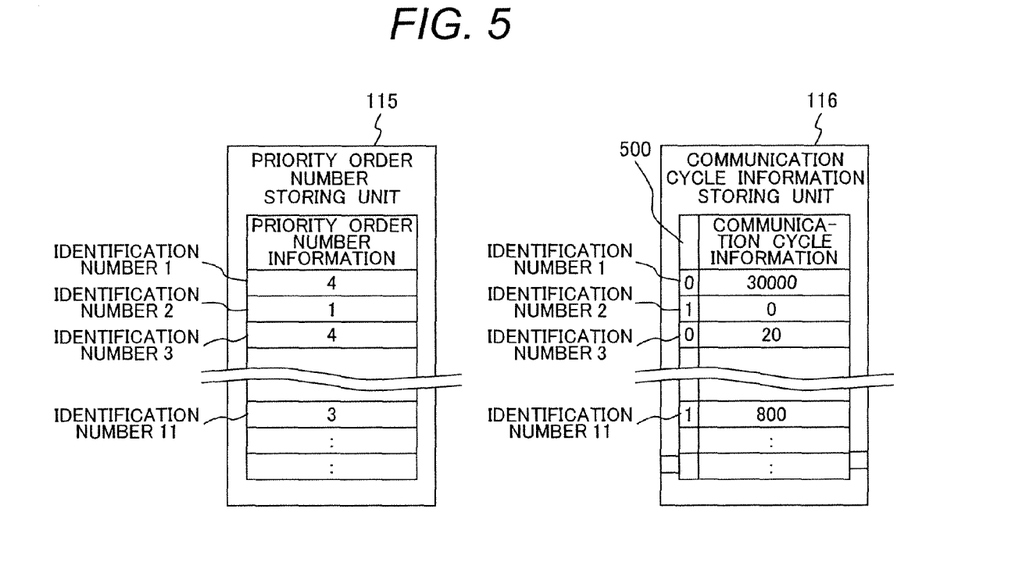
FIG. 5 is a view for explaining a storing method in a priority order number storing unit and a communication cycle information storing unit according to the present invention.

FIG. 5 shows a method of storing the optimized priority order number for the respective terminal communication units 120 through the processing by the application 300 and the communication cycle to the devices connected to the respective terminal communication units 120 set at the communication performance setting portion in the application 300 respectively in the priority order number storing units 115 and the communication cycle information storing unit 116 in the central communication unit 110.

The software 101 causes to store both the priority order number and the communication cycle in the priority order number storing units 115 and in the communication cycle information storing unit 116 while correlating to the identification number assigned to the respective terminal communication units 120.

Further, the software 101 causes to store the input and output data updating mode set at the input and output data updating mode setting portion 313 in the application 300 in an instant communication information storing portion 500 in the communication cycle information storing unit 116 in such a manner that when periodic as "0" and when instant as "1".

Figure 6:
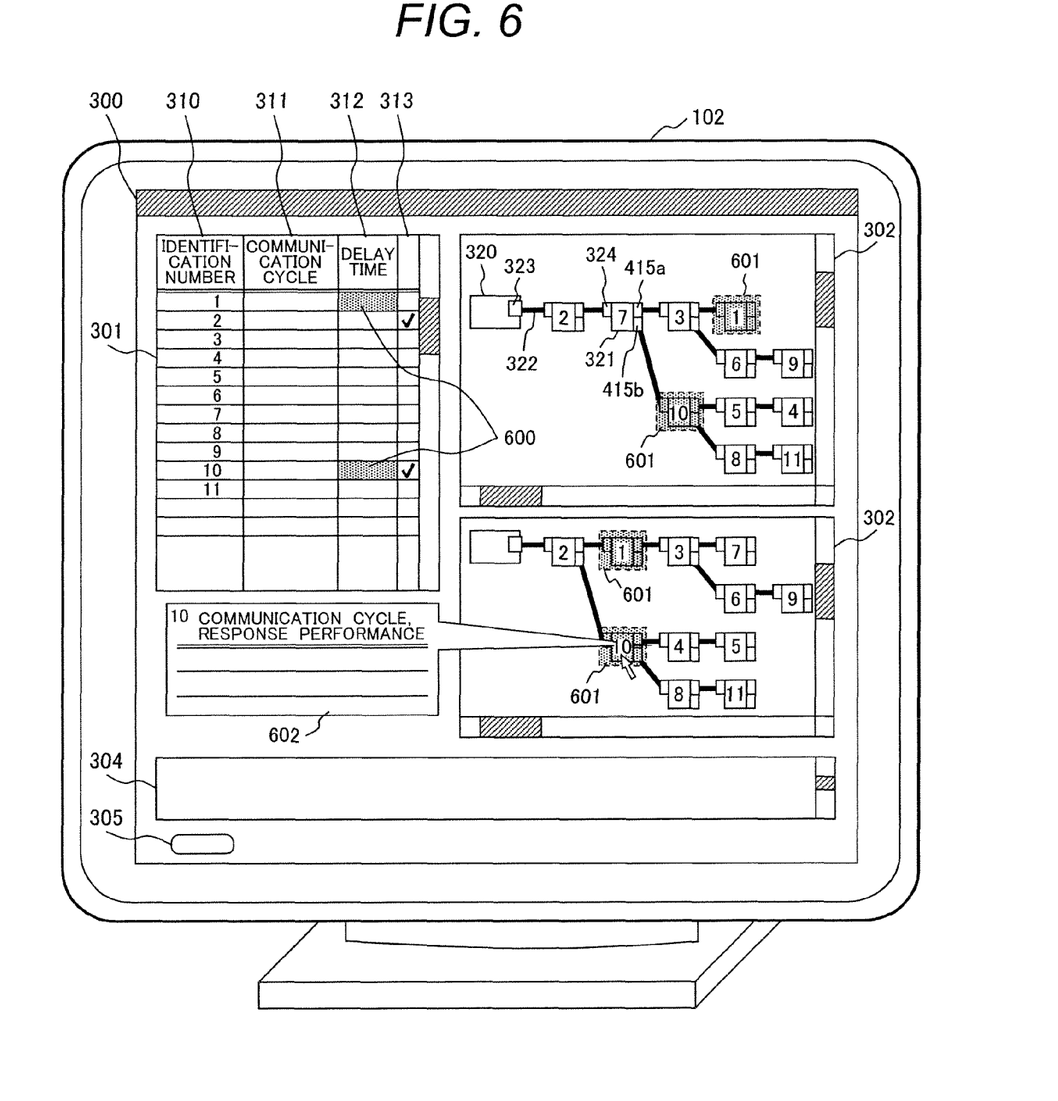
FIG. 6 is a view for explaining a display example on a screen and a function of an application after completion of optimization processing in an embodiment according to the present invention.

FIG. 6 shows an example of displaying a result of the optimization processing by the application 300. During when the optimization processing is being executed after the optimization processing start button 305 is pressed, the application 300 causes to display the advancing state of the processing on the process displaying portion 304, and to display success or fail of the optimization at the time of completing the optimization processing.

Further, when the optimization processing is successful, the application 300 causes to display the optimized network connection configuration on the network connection configuration displaying portion 303, and when the optimization processing failed, the application 300 determines a combination having the least numbers of terminal communication units 120 that do not fulfill the set value of the communication delay time in the communication performance setting portion 301 among combinations of the incorrect priority order number settings and the incorrect connection configurations tried calculation during the optimization processing as error information, and causes to display an error part indicating means 600 at a part where the set value of the communication performance setting portion 301 is not fulfilled, further, causes to display the network connection configuration at this time on the network connection configuration displaying portion 303, and to indicate an error part indicating means 601 on the terminal communication units symbols 321 that cannot fulfill the set values in the network connection configuration setting portion 302 and the network connection configuration displaying portion 303.

Further, when a system user selects a terminal communication unit symbol 321 designated by the error part indicating means 601, an error information indicating means 602 is displayed indicating the communication cycle and the set value of the communication delay time in the communication performance setting portion 301, and the actual communication delay time determined by the optimization processing corresponding to the selected terminal communication unit symbol 321.

According to the present embodiment, a plurality of devices of control objects having different communication cycle and response performance on one network can be controlled with proper communication speeds. Further, since a proper setting of priority order of data communication with the control objects and of layout of the devices of control objects on the network, which is necessary for connecting a plurality of devices of control objects having different communication cycle and response performance on one network and for controlling with a proper communication speed, can be optimized and determined through a software processing of the host computer, thereby, a network guaranteeing a required performance of the respective devices of control objects can be easily constructed.

Accordingly, an application field of the present invention to industrial machines is generally broad, for example, although a chip mounter is constituted by many control devices, and the communication cycles and response speeds required by the respective control devices are frequently different, however, when the present system is applied thereto, a network that fulfills the required performances of the respective control devices can be easily constructed.

EXPLANATION OF REFERENCE NUMERALS

100 Host computer
101 Software
102 Display unit
103 Information input unit
110 Central communication unit
111 Central communication control unit
112 Output data storing unit
113a First data storing unit
113b Second data storing unit
114 Identification number storing unit
115 Priority order number storing unit
116 Communication cycle information storing unit
117 Fifo type storing unit
120 Terminal communication unit
121 Terminal communication control unit
130 Communication port
131 Upstream communication port
132a, 132b Downstream communication port
140 Host computer interface unit
141 I/O port
150 Communication cable
200 Data portion
201 Packet type portion
202 Identification number portion
203 Priority order number portion
300 Application
301 Communication performance setting portion
302 Network connection configuration setting portion
303 Network connection configuration displaying portion
304 Process displaying portion
305 Optimization processing start button
310 Identification number setting portion
311 Communication cycle setting portion
312 Communication delay time setting portion
313 Input and output data updating mode setting portion
320 Central communication unit symbol
321 Terminal communication unit symbol
322 Connection state symbol
323 Communication port symbol
324 Upstream communication port symbol
325a, 325b Downstream communication port symbol
500 Instant communication information storing portion
600, 601 Error part indicating means
602 Error information indicating means

What we claim is:

1. An industrial network system comprising:
a host computer including a display unit, an information input unit, and software;
a central communication unit including a host computer interface unit, a first I/O data storing unit, a second I/O data storing unit, an identification number storing unit, a communication cycle data storing unit, at least one communication port, at least two fifo type storing units per one communication port and a central communication control unit; and
a plurality of terminal communication units each including one upstream communication port, at least two downstream communication ports, at least two fifo type storing units per one downstream communication port, at least one I/O port, a terminal communication control unit, an identification number storing unit, a priority order number storing unit, and a communication cycle information storing unit,
wherein:
the upstream communication ports of the terminal communication units are connected to the at least one communication port in the central communication unit or to a downstream communication port of any other terminal communication unit in the plurality of terminal communication units;
the central communication unit sends to the terminal communication units individual values of communication cycles required for every control object that is stored in the communication cycle information storing unit from the host computer;
each terminal communication unit stores the received individual value based on the communication cycle in the communication cycle information storing unit and transfers output data at a cycle based on a value sent to the respective terminal communication unit;
the central communication unit causes to store an input value of the I/O port received from each terminal communication unit in a first input data storing unit, and causes to store the input value in the first input data storing unit in a second input data storing unit based on the communication cycle in the communication cycle information storing unit; and
the host computer confirms values of the I/O ports of the respective terminal communication units with reference to the second input data storing unit of the central communication unit.

2. The industrial network system according to claim 1, wherein:
the central communication unit sends to the terminal communication units numbers representing priority orders of data communication from the host computer stored in the priority order number storing unit,
each terminal communication unit is capable of storing the received priority order number in the priority order number storing unit, when the central communication unit sends output data to each terminal communication unit,
the central communication unit causes to store the output data in the fifo type storing units corresponding to the priority order number of each terminal communication unit,
the at least one communication port of the central communication unit takes out orderly the output data from the fifo type storing units according to the priority order and sends the output data,
each terminal communication unit forms an input data packet by combining an input value from the I/O port and priority order number information stored in the priority order number storing unit and outputs the input data packet to the upstream communication port,
data from the downstream communication port are stored in separate fifo type storing units corresponding to the priority order number of the input data packet, and
input data packets stored in the fifo type storing units are orderly sent out according to the priority order to the upstream communication port.

3. The industrial network system according to claim 1, wherein a summed value of values of communication cycles stored in the communication cycle information storing units in all of the terminal communication units connected to a network is set below the maximum performance of the network.

4. The industrial network system according to claim 3, wherein in order to maintain the communication cycles required for the respective control objects, values of priority order numbers is set so that time variability of the communication cycles of the terminal communication units is confined within a range of one cycle.

5. The industrial network system according to claim 1, wherein set values of priority order numbers of the terminal communication units and a number of terminal communication units to be passed from the central communication unit to an objective terminal communication unit are set based on a communication delay time from a control object to the host computer required for the respective control devices.

6. The industrial network system according to claim 1, wherein the software in the host computer is provided with a function capable of setting the communication cycle required for the control object from the information input unit.

7. The industrial network system according to claim 1, wherein the software in the host computer is provided with a function capable of setting the communication cycles required for all of the control objects, a maximum allowable communication delay time and a connection configuration depth of the terminal communication units on a network from the information input unit.

8. The industrial network system according to claim 7, wherein the setting function and the display function of the network constitution included in the software of the host computer are implemented through a graphical user interface (GUI).

9. The industrial network system according to claim 1, wherein a plurality of control devices constituting a chip mounter is connected to the plurality of terminal communication units.

10. An industrial network system comprising:
a host computer including a display unit, an information input unit, and software;
a central communication unit including a host computer interface unit, a first I/O data storing unit, a second I/O data storing unit, an identification number storing unit, a communication cycle data storing unit, at least one communication port, at least two fifo type storing units per one communication port and a central communication control unit; and
a plurality of terminal communication units each including one upstream communication port, at least two downstream communication ports, at least two fifo type storing units per one downstream communication port, at least one I/O port, a terminal communication control unit, an identification number storing unit, a priority order number storing unit, and a communication cycle information storing unit,
wherein:
the upstream communication ports of the terminal communication units are connected to the at least one communication port in the central communication unit or to a downstream communication port of any other terminal communication unit in the plurality of terminal communication units;
the host computer determines communication delay times from terminal communication units for the respective control objects by making use of priority of terminal communication units, a number of communication packets of terminal communication units of which priority is equal to or higher than the priority order set for the terminal communication unit, communication time per one communication path and the number of terminal communication units to be passed from the central communication unit to an objective terminal communication unit; and
the host computer changes the priority of the respective terminal communication units so as to fulfill a communication delay time required for the control object and sets the priority of the terminal communication unit.

11. An industrial network system comprising:
a host computer including a display unit, an information input unit, and software;
a central communication unit including a host computer interface unit, a first I/O data storing unit, a second I/O data storing unit, an identification number storing unit, a communication cycle data storing unit, at least one communication port, at least two fifo type storing units per one communication port and a central communication control unit; and
a plurality of terminal communication units each including one upstream communication port, at least two downstream communication ports, at least two fifo type storing units per one downstream communication port, at least one I/O port, a terminal communication control unit, an identification number storing unit, a priority order number storing unit, and a communication cycle information storing unit,
wherein:
the upstream communication ports of the terminal communication units are connected to the at least one communication port in the central communication unit or to a downstream communication port of any other terminal communication unit in the plurality of terminal communication units;
the host computer determines communication delay times from terminal communication units for the respective control objects by making use of priority of terminal communication units, a number of communication packets of terminal communication units of which priority is equal to or higher than the priority order set for the terminal communication unit, communication time per one communication path and the number of terminal communication units to be passed from the central communication unit to an objective terminal communication unit; and
the host computer changes the layout of the control object so as to fulfill a communication delay time required for the control object and sets the number of terminal communication units to be passed from the central communication unit to an objective terminal communication unit.

* * * * *